US011663748B2

(12) United States Patent
Ding et al.

(10) Patent No.: US 11,663,748 B2
(45) Date of Patent: May 30, 2023

(54) DISPLAY CONTROL DEVICE, DISPLAY CONTROL SYSTEM, AND DISPLAY CONTROL METHOD

(71) Applicant: Komatsu Ltd., Tokyo (JP)

(72) Inventors: Qi Ding, Tokyo (JP); Yasuhiro Ibusuki, Tokyo (JP); Jun Morinaga, Tokyo (JP); Masanori Minagawa, Tokyo (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 17/046,060

(22) PCT Filed: Jul. 18, 2019

(86) PCT No.: PCT/JP2019/028255
§ 371 (c)(1),
(2) Date: Oct. 8, 2020

(87) PCT Pub. No.: WO2020/044836
PCT Pub. Date: Mar. 5, 2020

(65) Prior Publication Data
US 2021/0174554 A1    Jun. 10, 2021

(30) Foreign Application Priority Data

Aug. 31, 2018    (JP) .............................. JP2018-163775

(51) Int. Cl.
*E02F 9/20*    (2006.01)
*E02F 9/26*    (2006.01)
(Continued)

(52) U.S. Cl.
CPC .............. *G06T 11/00* (2013.01); *E02F 9/205* (2013.01); *E02F 9/261* (2013.01); *G01G 19/12* (2013.01); *H04N 7/183* (2013.01)

(58) Field of Classification Search
None
See application file for complete search history.

(56) References Cited

U.S. PATENT DOCUMENTS 9,204,106 B2 *    12/2015  Mitsuta ................... H04N 7/18
10,942,351 B2 *    3/2021  Ohiwa .................. E02F 9/2228
(Continued)

FOREIGN PATENT DOCUMENTS

AU     2016219013 B2    12/2019
AU     2018201726 B2    1/2020
(Continued)

OTHER PUBLICATIONS

JP2013113044, Takeya, "Monitor System For Construction Machine", translated copy (Year: 2013).*

*Primary Examiner* — David H Chu
(74) *Attorney, Agent, or Firm* — Fish & Richardson P.C.

(57)    ABSTRACT

A captured image acquisition unit of a display control device according to the present invention acquires an image captured by an imaging device mounted on a loading vehicle. A loaded weight acquisition unit acquires a loaded weight measured by a weight scale mounted on a transport vehicle. A display image generation unit generates a display image obtained by disposing an image showing the loaded weight on the captured image. A display control unit outputs a display signal for displaying the display image to a display device.

12 Claims, 10 Drawing Sheets

(51) Int. Cl.
*G01G 19/12* (2006.01)
*G06T 11/00* (2006.01)
*H04N 7/18* (2006.01)

(56) References Cited

U.S. PATENT DOCUMENTS

| | | | | |
|---|---|---|---|---|
| 2014/0231153 | A1* | 8/2014 | Fukasu | G01G 19/08 |
| | | | | 177/25.13 |
| 2017/0248946 | A1 | 8/2017 | Ogura et al. | |
| 2017/0344004 | A1* | 11/2017 | Foster | G05D 1/0295 |
| 2018/0052038 | A1 | 2/2018 | Minoshima | |
| 2018/0179732 | A1* | 6/2018 | Bartsch | E02F 9/205 |
| 2020/0041329 | A1* | 2/2020 | Shike | E02F 9/26 |
| 2021/0017738 | A1* | 1/2021 | Sano | E02F 9/264 |

FOREIGN PATENT DOCUMENTS

| | | |
|---|---|---|
| JP | 2013/113044 | 6/2013 |
| JP | 2016/212055 | 12/2016 |
| JP | 2017/089139 | 5/2017 |
| WO | WO 2013/065415 | 5/2013 |
| WO | WO 2018/124144 | 7/2018 |

\* cited by examiner

DISPLAY CONTROL DEVICE, DISPLAY CONTROL SYSTEM, AND DISPLAY CONTROL METHOD

CROSS-REFERENCE TO RELATED APPLICATIONS

This application is a National Stage application under 35 U.S.C. § 371 of International Application No. PCT/JP2019/028255, filed on Jul. 18, 2019, which claims priority to Japanese Patent Application No. 2018-163775, filed on Aug. 31, 2018. The contents of the prior applications are incorporated herein in their entirety.

TECHNICAL FIELD

The present invention relates to a method for manufacturing a reactor and a reactor.

BACKGROUND ART

A technique of performing remote operation of a loading vehicle is known. In order to perform remote operation of the loading vehicle, it is necessary to be able to recognize a situation surrounding the loading vehicle from the outside. For this reason, the loading vehicle performed remote operation includes an imaging device that images a surrounding situation and a communication device that transmits the captured image to the outside. Accordingly, an operator can perform operation while visually recognizing the image transmitted from the loading vehicle.

In addition, Patent Literature 1 discloses a technique of displaying the loadage of a transport vehicle on a display device of the loading vehicle.

CITATION LIST

Patent Literature

Patent Literature 1
PCT International Publication No. WO2013/065415

SUMMARY OF INVENTION

Technical Problem

In a case of performing remote operation of the loading vehicle, the operator visually recognizes the transport vehicle from the image displayed on a display. Thus, it is difficult to recognize the loadage of the transport vehicle.

An object of an aspect of the present invention is to provide a display control device, a display control system, and a display control method, which allow an operator of a loading vehicle related to remote control to visually recognize the loadage of a transport vehicle easily.

Solution to Problem

A first aspect of the present invention provides a display control device for a display device. The display control device includes: a captured image acquisition unit that is configured to acquire an image captured by an imaging device mounted on a loading vehicle; a loaded weight acquisition unit that is configured to acquire a loaded weight measured by a weight scale mounted on a transport vehicle; a display image generation unit that is configured to generate a display image obtained by disposing an image showing the loaded weight on the captured image; and a display control unit that is configured to output the display image to the display device.

Advantageous Effects of Invention

In the at least one aspect, the display control device allows the operator of the loading vehicle related to remote control to visually recognize the loadage of the transport vehicle easily.

DESCRIPTION OF EMBODIMENTS

First Embodiment

<<Remote Operation System>>

Figure 1:
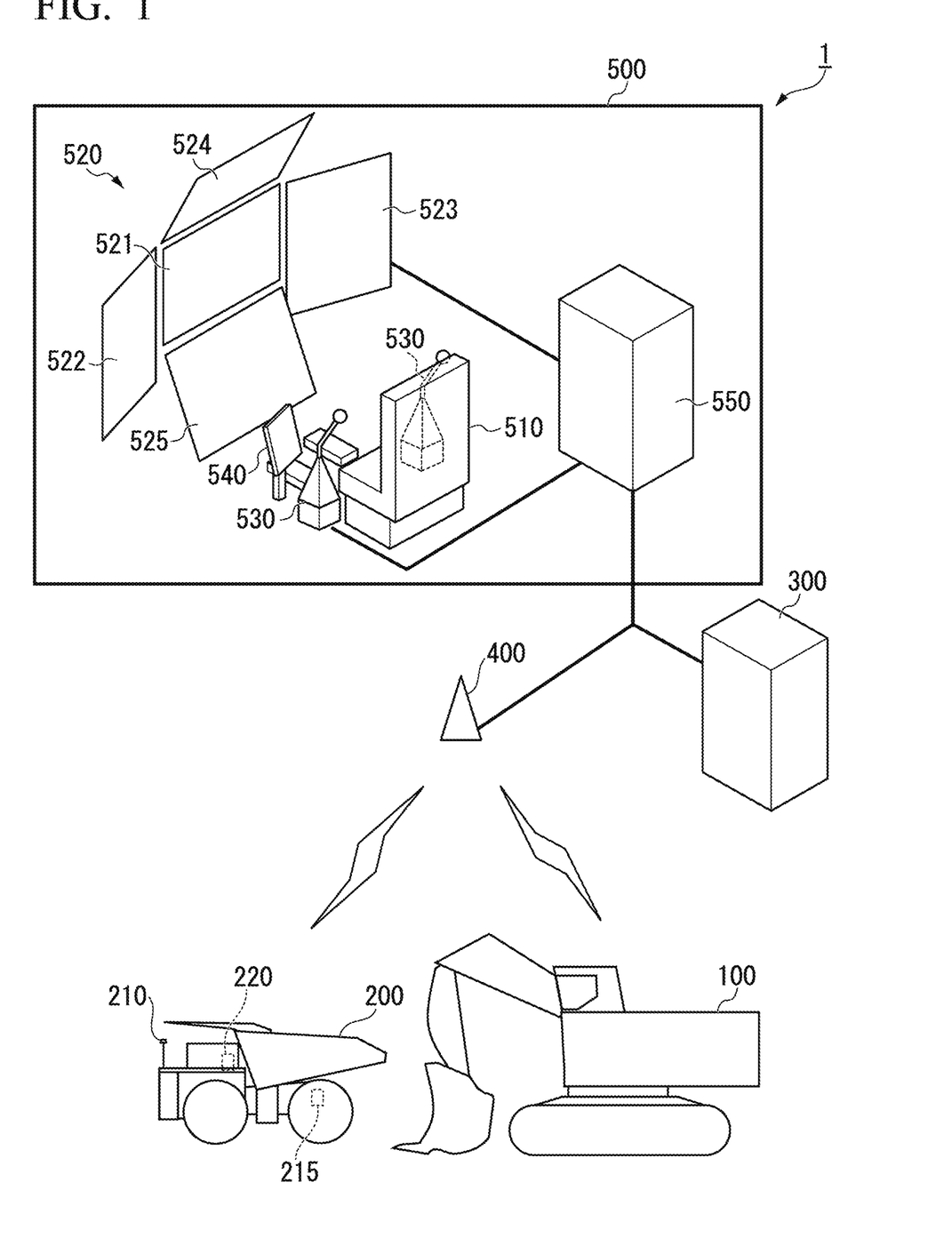
FIG. 1 is a schematic view illustrating a configuration of an operation system according to a first embodiment.

FIG. 1 is a schematic view illustrating a configuration of an operation system according to a first embodiment.

An operation system 1 includes one or a plurality of loading vehicles 100 that operate through remote control, a plurality of transport vehicles 200, a controlling gear 300, an access point 400, and one or a plurality of remote operation rooms 500 that perform remote operation of the loading vehicles 100.

The transport vehicle 200 travels in an unmanned manner along a travel route based on course data (for example, speed information and coordinates for which an unmanned transport car is to head) received from the controlling gear 300. The transport vehicle 200 and the controlling gear 300 are connected to each other through communication via the access point 400. The controlling gear 300 acquires a position and an azimuth direction from the transport vehicle 200 and generates course data used in the traveling of the transport vehicle 200 based on the position and the azimuth direction. The controlling gear 300 transmits the course data to the transport vehicle 200. The transport vehicle 200 travels in an unmanned manner based on the received course data. That is, the operation system 1 includes an unmanned transfer system configured of the transport vehicle 200 and the controlling gear 300. The operation system 1 according to the first embodiment includes the unmanned transfer system, but some or all of transport cars may be operated in a manned manner in another embodiment. In this case, it is not necessary for the controlling gear 300 to transmit course data and an instruction related to loading, but the controlling gear acquires the position and azimuth direction of the transport car.

The loading vehicle 100 is performed remote operation in response to an operation signal transmitted from the remote operation room 500. The loading vehicle 100 and the remote operation room 500 are connected to each other through communication via the access point 400. A control device 550 of the remote operation room 500 receives operation of the loading vehicle 100 from an operator and transmits the operation signal to the loading vehicle 100. The loading vehicle 100 is driven in response to the operation signal received from the remote operation room 500. That is, the operation system 1 includes a remote operating system configured of the loading vehicle 100 and the remote operation room 500.

The loading vehicle 100 and the transport vehicle 200 operate at a work site (for example, a mine and a quarry). The remote operation room 500 is provided at a point separated away from the loading vehicle 100 and the transport vehicle 200 (for example, a city and an inside of the work site).

<<Travel Route>>

Figure 2:
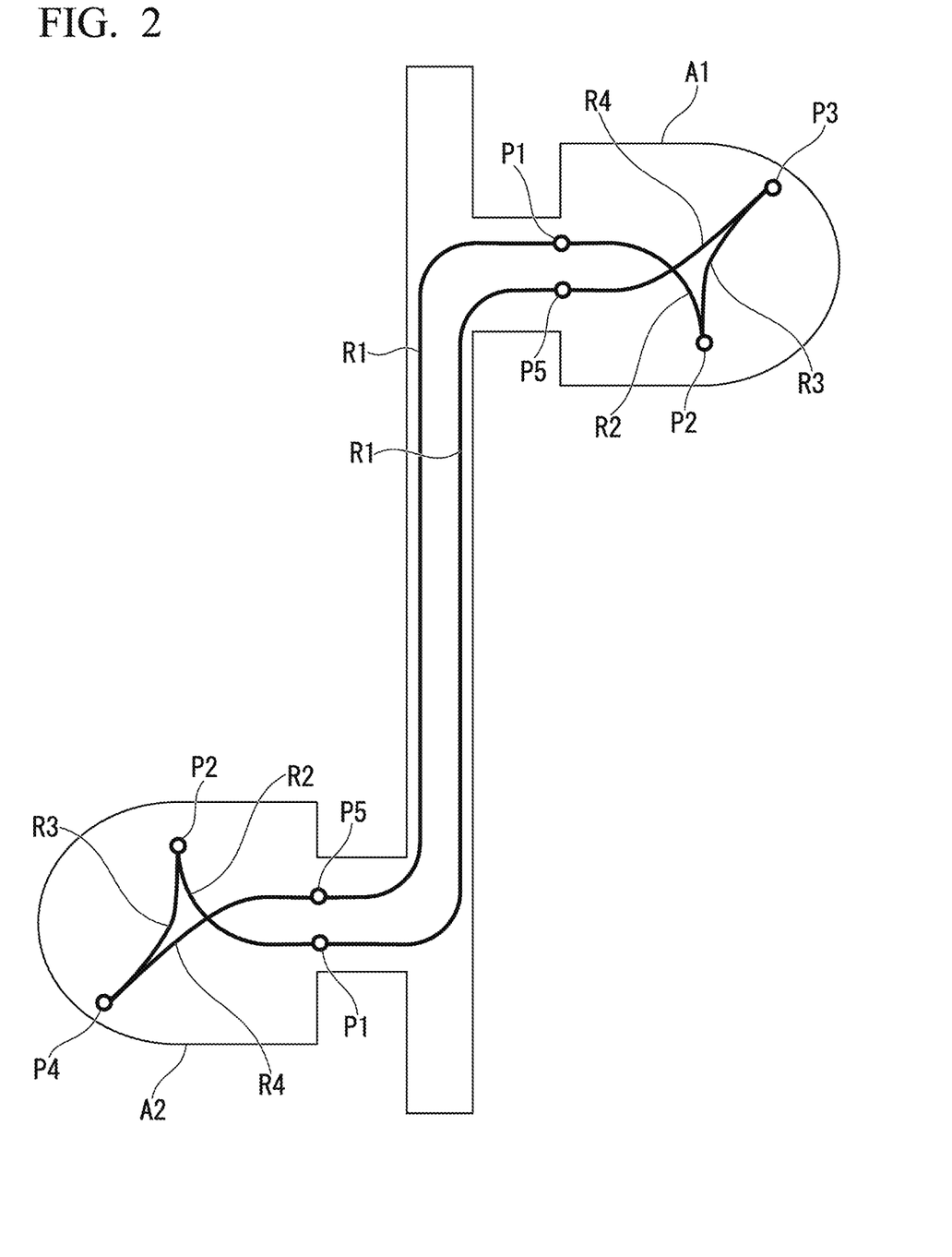
FIG. 2 is a diagram illustrating an example of a travel route.

FIG. 2 is a diagram illustrating an example of a travel route.

A travel route R to be traveled is set for the transport vehicle 200. The travel route R has a connection route R1 which connects two areas A (for example, a loading site A1 and a dumping site A2) to each other and is determined in advance, an access route R2, an approach route R3, and an exit route R4, which are routes in each area A. The access route R2 is a route that connects a standby point P1, which is one end of the connection route R1 in each area A, and a predetermined turning point P2 to each other. The approach route R3 is a route that connects the turning point P2 and a loading point P3 or a dumping point P4 to each other in each area A. The exit route R4 is a route that connects the loading point P3 or the dumping point P4 and an exit point P5, which is the other end of the connection route R1, to each other in each area A. The loading point P3 is a point set by operation by the operator of the loading vehicle 100. The turning point P2 is a point set by the controlling gear 300 according to the position of the loading point P3 or the dumping point P4.

<<Remote Operation Room>>

The remote operation room 500 includes an operator's seat 510, a display device 520, a first operation device 530, a second operation device 540, and the control device 550.

The display device 520 is disposed to face the operator's seat 510. In the embodiment, the term "face" refers to a state where the front of the display device and the front of the operator's seat face each other so as to be parallel to each other or intersecting each other at an obtuse angle. The display device 520 is positioned in front of the operator's eyes when the operator sits in the operator's seat 510. As illustrated in FIG. 1, the display device 520 is configured of a central display 521, a left display 522, a right display 523, an upper display 524, and a lower display 525, which are arranged side by side. The left display 522 is provided on the left of the central display 521. The right display 523 is provided on the right of the central display 521. The upper display 524 is provided above the central display 521. The lower display 525 is provided below the central display 521.

In another embodiment, the number of displays configuring the display device 520 is not limited thereto. For example, the display device 520 may be configured of one display. In addition, the display device 520 may project an image on a curved surface or a spherical surface with a projector.

The first operation device 530 is an operation device for the remote operating system. The first operation device 530 is positioned within a range where the operator can operate when the operator sits in the operator's seat 510. The first operation device 530 includes, for example, an electric lever and an electric pedal. The first operation device 530 receives inputs of a raising operation signal and lowering operation signal of a boom 131, a pushing operation signal and pulling operation signal of an arm 132, an excavating operation signal and dumping operation signal of a bucket 133, a swinging operation signal of a swing body 120, and a traveling operation signal of a travel body 110.

The second operation device 540 is an operation device for the unmanned transfer system. The second operation device 540 is positioned within a range where the operator can operate when the operator sits in the operator's seat 510. The second operation device 540 is configured of a touch panel. The second operation device 540 receives inputs of a loading point instruction signal, an accessing instruction signal, and a departure instruction signal for the transport vehicle 200. The second operation device 540 transmits the input operation signals to the controlling gear 300. The remote operation room 500 according to another embodiment may not include the second operation device 540.

The control device 550 causes the display device 520 to display an image and vehicle body information which are received from loading vehicle 100. That is, the control device 550 is an example of a display control device. In addition, the control device 550 transmits an operation signal input in the first operation device 530 to the loading vehicle 100.

<<Transport Vehicle>>

The transport vehicle 200 according to the first embodiment is an off-road dump truck including a vessel. The transport vehicle 200 according to another embodiment may be a transport car other than a dump truck.

The transport vehicle 200 includes a position and azimuth direction calculator 210, a payload meter 215, and a control device 220.

The position and azimuth direction calculator 210 calculates the position and azimuth direction of the transport vehicle 200. The position and azimuth direction calculator 210 includes two receivers that receive positioning signals from an artificial satellite that configures Global Navigation Satellite System (GNSS). An example of GNSS is the Global Positioning System (GPS). The two receivers are provided at positions different from each other on the transport vehicle 200. The position and azimuth direction calculator 210 detects the position of the transport vehicle 200 in a site coordinate system based on the positioning signals received by the receivers. The position and azimuth direction calculator 210 uses the respective positioning signals received by the two receivers to calculate an azimuth direction in which the transport vehicle 200 faces as a relationship between a provision position of one receiver and a provision position of the other receiver. Without being limited thereto, in another embodiment, for example, the transport vehicle 200 may include an inertial measurement unit (IMU), and an azimuth direction may be calculated based on the measurement result from the inertial measurement device. In this case, the drift of the inertial measurement unit may be corrected based on a traveling trajectory of the transport vehicle 200. The transport vehicle 200 according to another embodiment may not include the position and azimuth direction calculator 210.

The payload meter 215 is a weight scale that measures the weight of a load loaded on the vessel of the transport vehicle 200, that is, the loaded weight of the transport vehicle 200. For example, the payload meter 215 may measure a pressure applied to a suspension cylinder of the transport vehicle 200 and convert the pressure into the weight.

The control device 220 transmits the position and the azimuth direction, which are detected by the position and azimuth direction calculator 210, and the loaded weight measured by the payload meter 215 to the controlling gear 300. The control device 220 receives, from the controlling gear 300, course data, a dumping instruction, an accessing instruction to the loading point, and a departure instruction from the loading point. The control device 220 causes the transport vehicle 200 to travel according to the received course data, or moves the vessel of the transport vehicle 200 up and down according to the dumping instruction.

Operation signals to the transport vehicle 200 include an accessing instruction signal and a departure instruction signal. The accessing instruction signal is a signal for instructing the transport vehicle 200 to access the loading point P3. The departure instruction signal is a signal for instructing the transport vehicle 200 to depart from the loading site A1 when the loading is completed.

In addition, the control device 220 transmits an arrival notification to the controlling gear 300 when the transport vehicle 200 has arrived at the loading point P3 in response to the accessing instruction signal.

<<Loading Vehicle>>

Figure 3:
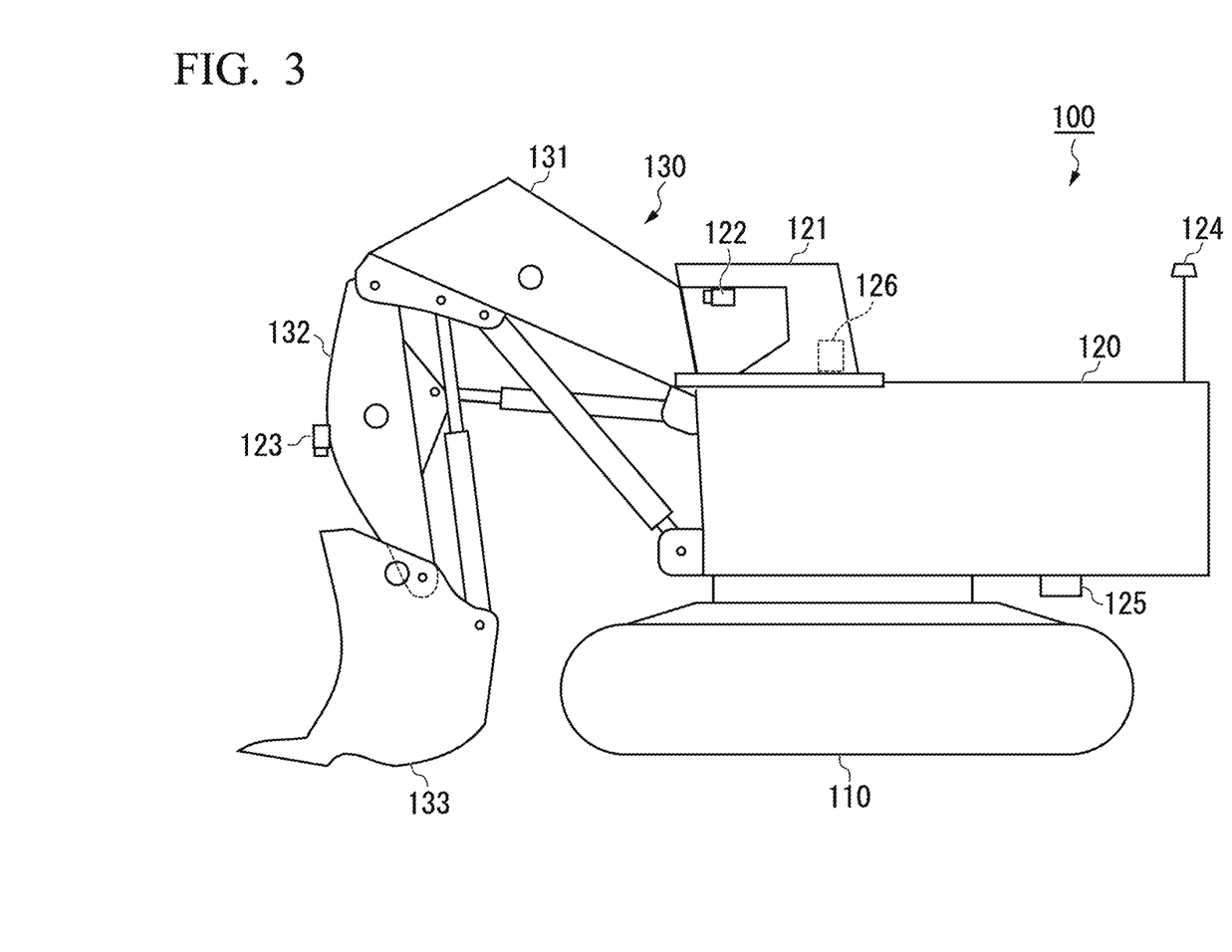
FIG. 3 is an external view of a loading vehicle according to the first embodiment.

FIG. 3 is an external view of the loading vehicle according to the first embodiment.

The loading vehicle 100 according to the first embodiment is a hydraulic excavator. The loading vehicle 100 according to another embodiment may be a loading vehicle other than the hydraulic excavator such as a wheel loader.

The loading vehicle 100 includes work equipment 130 that is driven by a hydraulic pressure, the swing body 120 that supports the work equipment 130, and the travel body 110 that supports the swing body 120.

The work equipment 130 includes the boom 131, the arm 132, and the bucket 133. A base end portion of the boom 131 is attached to the swing body 120 via a pin.

The arm 132 connects the boom 131 to the bucket 133. A base end portion of the arm 132 is attached to a tip portion of the boom 131 via a pin.

The bucket 133 includes a blade for excavating earth and a container for accommodating the excavated earth. A base end portion of the bucket 133 is attached to a tip portion of the arm 132 via a pin.

The swing body 120 includes a cab 121. The cab 121 is provided on the left of the work equipment 130. The cab 121 is provided with a front camera 122. The front camera 122 is provided in an upper front portion in the cab 121. The front camera 122 captures an image of the front of the cab 121 through a windshield in a front portion of the cab 121. Herein, the "front" refers to a direction in which the work equipment 130 is mounted on the swing body 120, and the "rear" refers to a direction opposite to the "front". The "side" refers to a direction (right-and-left direction) intersecting the front-and-rear direction. An example of the front camera 122 includes an imaging device using a charge coupled device (CCD) sensor and a complementary metal oxide semiconductor (CMOS) sensor. The loading vehicle 100 according to another embodiment may not include the cab 121. Also in this case, the front camera 122 is provided at a position corresponding to the cab 121 to image the front. In addition, in another embodiment, the front camera 122 may be configured of two or more cameras.

Figure 4:
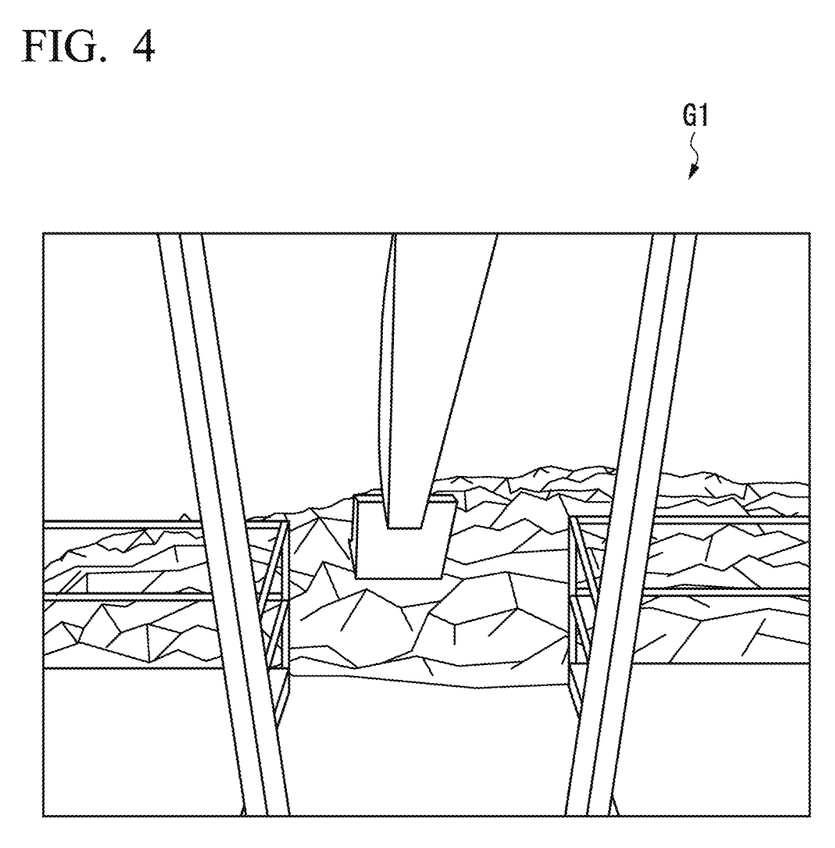
FIG. 4 is an example of an image captured by an imaging device of the loading vehicle according to the first embodiment.

FIG. 4 is an example of an image captured by an imaging device of the loading vehicle according to the first embodiment. The front camera 122 images a range where a loading operation target, which is in front of the work equipment 130 and the cab 121, appears. That is, in an image G1 captured by the front camera 122, the loading operation target, which is in front of the work equipment 130 and the cab 121, appears as illustrated in FIG. 4. In addition, since the cab 121 is provided on the left of the work equipment 130, part of the boom 131 appears in a right portion of the image G1. In addition, a ceiling portion of the cab 121 appears in an upper portion of the image G1.

The loading vehicle 100 includes the front camera 122, a bucket camera 123, a position and azimuth direction calculator 124, an inclination measuring instrument 125, and a control device 126.

The bucket camera 123 is provided on a front surface of the arm 132 and images the inside of the bucket 133. Hereinafter, an image captured by the bucket camera 123 will be referred to as a bucket internal image. The bucket camera 123 is an example of a sensor. The loading vehicle 100 according to another embodiment may not include the bucket camera 123.

The position and azimuth direction calculator 124 calculates a position of the swing body 120 and an azimuth direction in which the swing body 120 faces. The position and azimuth direction calculator 124 includes two receivers that receive positioning signals from an artificial satellite that configures GNSS. The two receivers are provided at positions different from each other on the swing body 120. The position and azimuth direction calculator 124 detects a position of a representative point of the swing body 120 in a site coordinate system (the origin of an excavator coordinate system) based on the positioning signals received by the receivers.

The position and azimuth direction calculator 124 uses the respective positioning signals received by the two receivers to calculate an azimuth direction in which the swing body 120 faces as a relationship between a provision position of one receiver and a provision position of the other receiver.

In another embodiment, the position and azimuth direction calculator 124 may detect an azimuth direction in which the swing body 120 faces based on a measurement value of a rotary encoder or an IMU. In addition, the loading vehicle 100 according to another embodiment may not include the position and azimuth direction calculator 124.

The inclination measuring instrument 125 measures the acceleration and angular speed of the swing body 120 and detects a posture (for example, a roll angle, a pitch angle, and a yaw angle) of the swing body 120 based on the measurement result. The inclination measuring instrument 125 is provided, for example, on a lower surface of the swing body 120. The inclination measuring instrument 125 can use, for example, an inertial measurement unit (IMU). In addition, the loading vehicle 100 according to another embodiment may not include the inclination measuring instrument 125.

The control device 126 transmits, to the remote operation room 500, information including an image captured by the front camera 122, an image captured by the bucket camera 123, and the swinging speed, position, azimuth direction, and inclination angle of the swing body 120. Hereinafter, information which is measured by various sensors included in the loading vehicle 100 and is transmitted by the control device 126 will be referred to as vehicle body information. The control device 126 receives an operation signal from the remote operation room 500. The control device 126 drives the work equipment 130, the swing body 120, or the travel body 110 based on the received operation signal.

<<Controlling Gear>>

Figure 5:
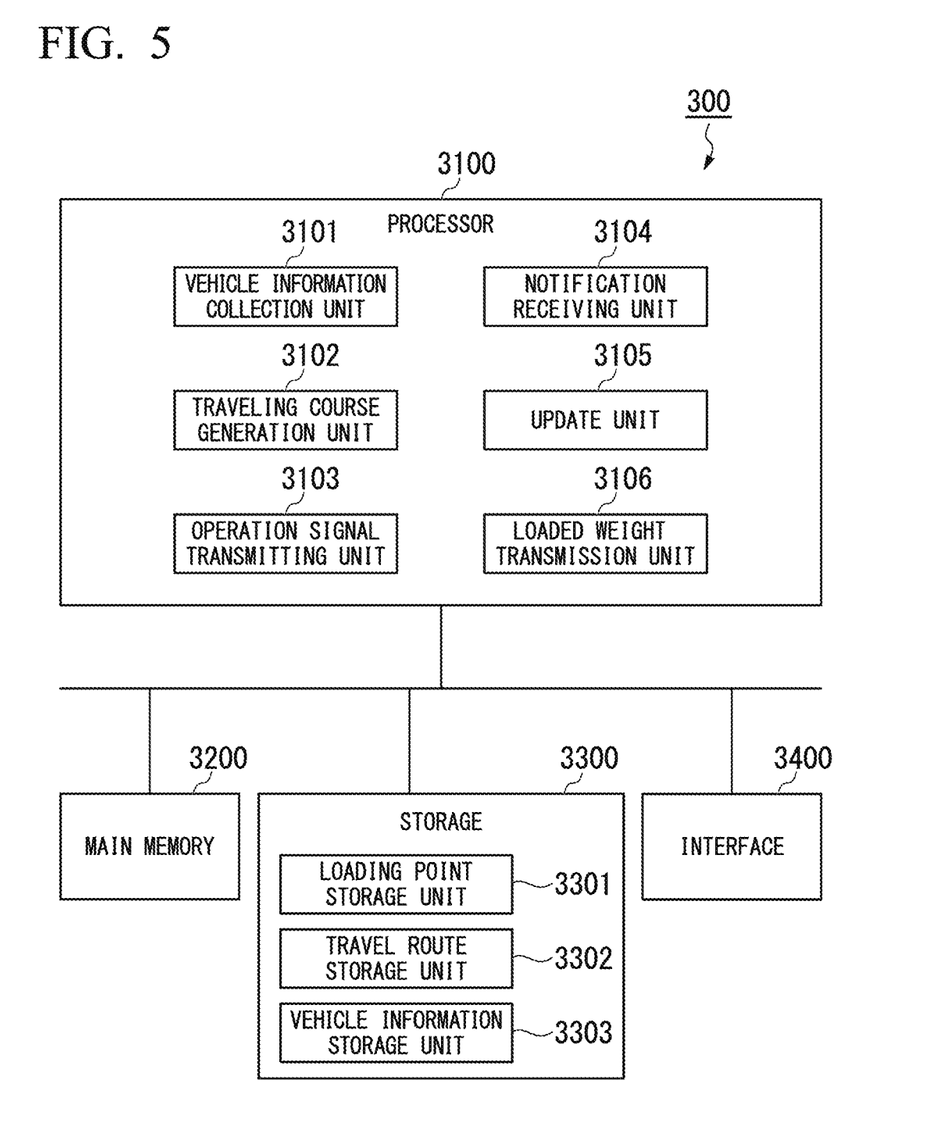
FIG. 5 is a schematic block diagram showing a configuration of a controlling gear according to the first embodiment.

FIG. 5 is a block diagram showing a configuration of the controlling gear according to the first embodiment.

The controlling gear 300 manages the traveling of the transport vehicle 200.

The controlling gear 300 is a computer including a processor 3100, a main memory 3200, a storage 3300, and an interface 3400. The storage 3300 stores a controlling program. The processor 3100 reads the controlling program from the storage 3300 to load the controlling program in the main memory 3200 and executes processing in accordance with the controlling program. The controlling gear 300 is connected to communication means via the interface 3400.

The storage 3300 has storage areas as a travel route storage unit 3302 and a vehicle information storage unit 3303. Examples of the storage 3300 include a hard disk drive (HDD), a solid state drive (SSD), a magnetic disk, a magneto-optical disk, a compact disc read only memory (CD-ROM), a digital versatile disc read only memory (DVD-ROM), and a semiconductor memory. The storage 3300 may be an internal medium directly connected to a common communication line of the controlling gear 300, or may be an external medium connected to the controlling gear 300 via the interface 3400. The storage 3300 is a non-transitory tangible storage medium.

By correlating with the loading vehicle 100, the loading point storage unit 3301 stores identification information and coordinates of the loading point P3 at which the loading vehicle 100 performs loading.

The travel route storage unit 3302 stores the travel route R shown in FIG. 2 for each transport vehicle 200. The controlling gear 300 receives a loading point instruction signal to prompt the operator of the loading vehicle 100 to designate the coordinates of the loading point P3 and sets the loading point P3 in response to the loading point instruction signal. The controlling gear 300 calculates the access route R2, the approach route R3, and the exit route R4 each time the loading point P3 is set. The loading point P3 may be designated by the operator of the transport vehicle 200 who manages the transport vehicle 200 in a control room in which the controlling gear 300 is provided.

The vehicle information storage unit 3303 stores the position information, azimuth direction information, loaded weight, maximum loaded weight, and standby information of each transport vehicle 200. The standby information is information indicating whether or not the transport vehicle 200 is stopped at the loading point P3. That is, in a case where the transport vehicle 200 is stopped at the loading point P3, standby information indicates "true", and in a case where the transport vehicle 200 is not at the loading point P3, standby information indicates "false".

By executing the controlling program, the processor 3100 includes a vehicle information collection unit 3101, a traveling course generation unit 3102, an operation signal transmitting unit 3103, a notification receiving unit 3104, an update unit 3105, and a loaded weight transmission unit 3106.

The vehicle information collection unit 3101 receives position information, azimuth direction information, and loaded weight information from the transport vehicle 200 via the access point 400. The vehicle information collection unit 3101 causes the vehicle information storage unit 3303 to store the received position information, azimuth direction information, and loaded weight information.

The traveling course generation unit 3102, based on a travel route, which is stored in the travel route storage unit 3302, and position information and azimuth direction information, which are stored in the vehicle information storage unit 3303, generates course data indicating an area where the movement of the transport vehicle 200 is allowed and transmits the course data to the transport vehicle 200. The course data is, for example, information indicating an area where the transport vehicle 200 can travel at a predetermined speed within a certain period of time and does not overlap a travel route of another transport vehicle 200. In a case where a stop signal of the transport vehicle 200 is received from the remote operation room 500, the traveling course generation unit 3102 transmits the stop signal to the transport vehicle 200.

The operation signal transmitting unit 3103 receives, from the remote operation room 500, an operation signal to the transport vehicle 200 and transmits the operation signal to the transport vehicle 200. The operation signal to the transport vehicle 200 includes an accessing instruction signal and a departure instruction signal. The accessing instruction signal is a signal for instructing the transport vehicle 200 to access the loading point P3. The departure instruction signal is a signal for instructing the transport vehicle 200 to depart from the loading site A1 when the loading is completed.

The notification receiving unit 3104 receives an arrival notification from the transport vehicle 200.

In a case where an arrival notification from the transport vehicle 200 is received, the update unit 3105 updates standby information correlated with the transport vehicle 200 in the vehicle information storage unit 3303 to "true". On the other hand, in a case where a departure instruction signal is received from the remote operation room 500, the update unit 3105 updates standby information correlated with the transport vehicle 200 in the vehicle information storage unit 3303 to "false".

The loaded weight transmission unit 3106 transmits the loaded weight of the transport vehicle 200 to the remote operation room 500 for operating the loading vehicle 100 correlated with the loading point P3 of the transport vehicle 200 whose standby information indicates "true". That is, the loaded weight transmission unit 3106 transmits the loaded weight of a target transport vehicle, which is a loading target of the loading vehicle 100, out of the plurality of transport vehicles 200, to the loading vehicle 100. The target transport vehicle of the loading vehicle 100 is the transport vehicle 200 which is stopped at the loading point P3 correlated with the loading vehicle 100 and of which standby information indicates "true".

<<Operation Method of Controlling Gear>>

Figure 6:
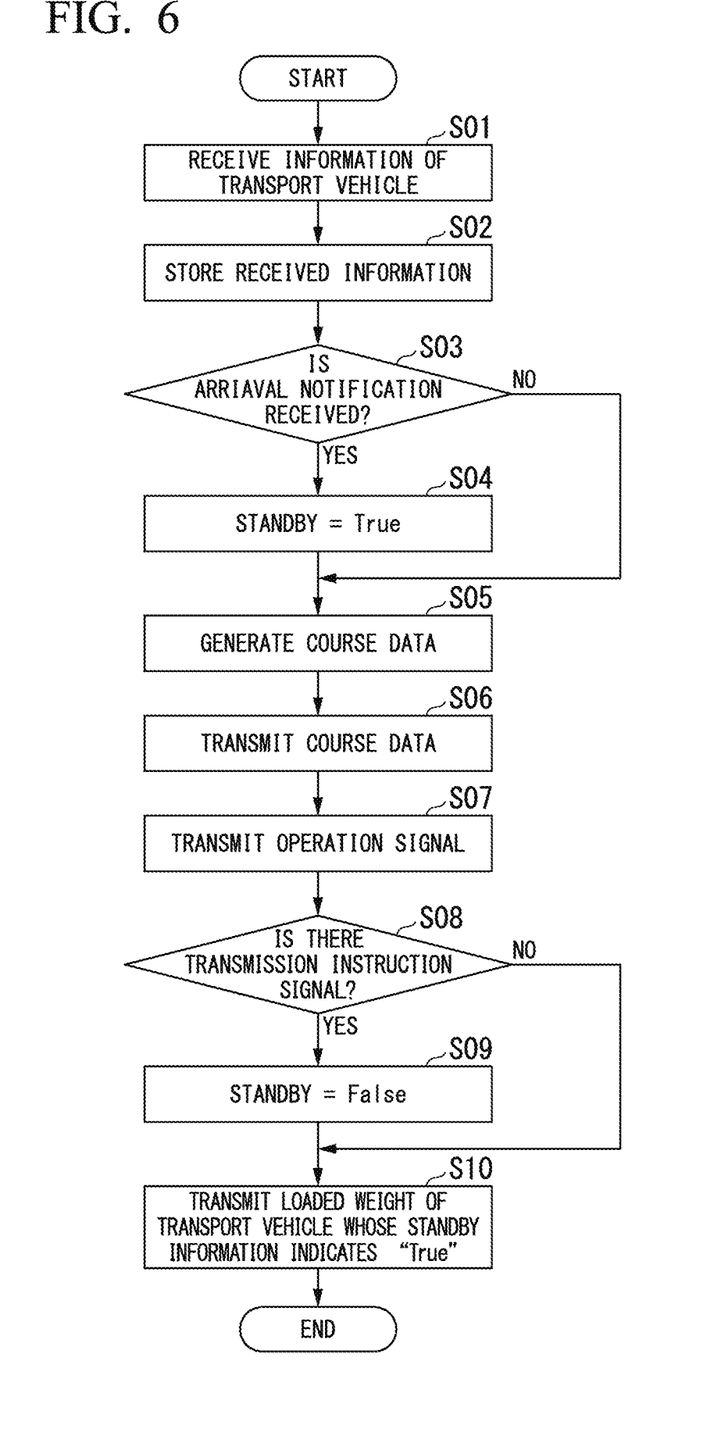
FIG. 6 is a flowchart showing an operation method of the controlling gear according to the first embodiment.

FIG. 6 is a flowchart showing an operation method of the controlling gear according to the first embodiment.

The controlling gear 300 executes the following processing for each predetermined control cycle.

The vehicle information collection unit 3101 receives position information, azimuth direction information, and loaded weight information from the transport vehicle 200 via the access point 400 (Step S01). The vehicle information collection unit 3101 stores the received position information, azimuth direction information, and loaded weight information in the vehicle information storage unit 3303 (Step S02). In addition, the notification receiving unit 3104 determines whether or not an arrival notification indicating that the transport vehicle has arrived at the loading point P3 in response to an accessing instruction signal is received from the transport vehicle 200 (Step S03).

In a case where the arrival notification is received from the transport vehicle 200 (Step S03: YES), the update unit 3105 updates standby information correlated with the transport vehicle 200 to "true" (Step S04). In a case where the arrival notification is not received from the transport vehicle 200 (Step S03: NO), the standby information is not updated.

Next, the traveling course generation unit 3102 generates course data indicating an area where the movement of each transport vehicle 200 is allowed based on a travel route, which is stored in the travel route storage unit 3302, and the position information and the azimuth direction information, which are stored in the vehicle information storage unit 3303 (Step S05). The traveling course generation unit 3102 transmits the generated course data to the transport vehicle 200 via the access point 400 (Step S06).

In addition, the operation signal transmitting unit 3103 receives, from the remote operation room 500, an operation signal to the transport vehicle 200 and transmits the operation signal to the transport vehicle 200 (Step S07). Specifically, in a case where the accessing instruction signal is received from the remote operation room 500, the operation signal transmitting unit 3103 transmits the accessing instruction signal to the transport vehicle 200 stopped at the standby point P1, which is a starting point of the approach route R3 whose end point is the loading point P3 correlated with the loading vehicle 100 operated by the remote operation room 500. In addition, in a case where a departure instruction signal is received from the remote operation room 500, the operation signal transmitting unit 3103 transmits the departure instruction signal to the transport vehicle 200 stopped at the loading point P3 correlated with the loading vehicle 100 operated by the remote operation room 500. The update unit 3105 determines whether or not the received operation signal includes the departure instruction signal (Step S08). In a case where the operation signal includes the departure instruction signal (Step S08: YES), the update unit 3105 updates the standby information correlated with the transport vehicle 200, which is a destination for the departure instruction signal in the vehicle information storage unit 3303, to "false" (Step S09).

In a case where the operation signal does not include the departure instruction signal (Step S08: NO) or in a case where the standby information is updated based on the departure instruction signal in Step S09, the loaded weight transmission unit 3106 transmits the loaded weight and maximum loaded weight of the transport vehicle 200 to the remote operation room 500 for operating the loading vehicle 100 correlated with the loading point P3 of the transport vehicle 200 whose standby information indicates "true" (Step S10).

<<Control Device of Remote Operation Room>>

Figure 7:
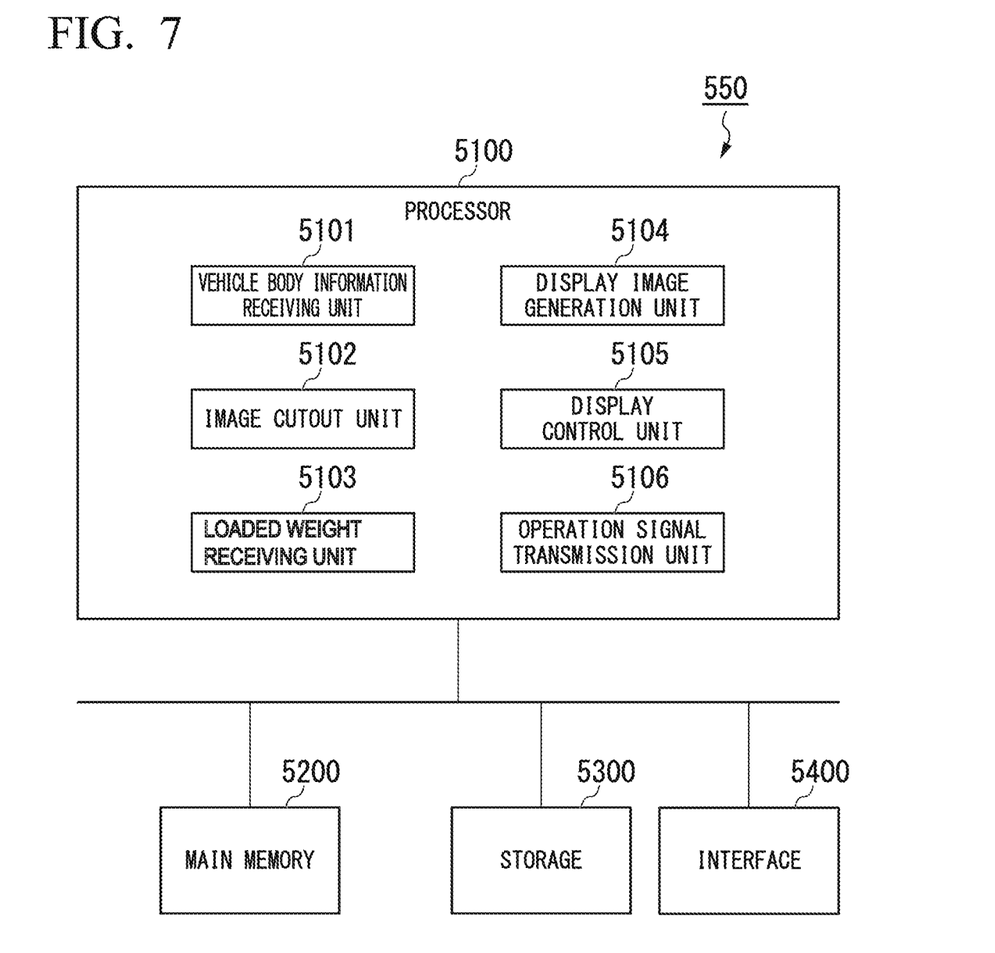
FIG. 7 is a schematic block diagram showing a configuration of a control device of a remote operation room according to the first embodiment.

FIG. 7 is a schematic block diagram showing a configuration of the control device for the remote operation room according to the first embodiment.

The control device 550 is a computer including a processor 5100, a main memory 5200, a storage 5300, and an interface 5400. The storage 5300 stores a program. The processor 5100 reads the program from the storage 5300 to load the program in the main memory 5200, and executes processing in accordance with the program.

Examples of the storage 5300 include a hard disk drive (HDD), a solid state drive (SSD), a magnetic disk, a magneto-optical disk, a compact disc read only memory (CD-ROM), a digital versatile disc read only memory (DVD-ROM), and a semiconductor memory. The storage 5300 may be an internal medium directly connected to a common communication line of the control device 550, or may be an external medium connected to the control device 550 via the interface 5400. The storage 5300 is a non-transitory tangible storage medium. In another embodiment, in addition to the configuration or instead of the configuration, the control device 550 may include a custom large scale integrated circuit (LSI) such as a programmable logic device (PLD) or a semi-LSI such as application specific integrated circuit (ASIC). Examples of the PLD include Programmable Array Logic (PAL), Generic Array Logic (GAL), a complex programmable logic device (CPLD), and field programmable gate array (FPGA). In this case, some or all of functions realized by the processor 5100 may be realized by the integrated circuit.

By executing the program, the processor 5100 includes a vehicle body information receiving unit 5101, an image cutout unit 5102, a loaded weight receiving unit 5103, a display image generation unit 5104, a display control unit 5105, and an operation signal transmission unit 5106.

The vehicle body information receiving unit 5101 receives, from the loading vehicle 100, information including an image captured by the front camera 122 and the swinging speed, position, azimuth direction, and inclination angle of the swing body 120. That is, the vehicle body information receiving unit 5101 is an example of a captured image acquisition unit and a measurement value acquisition unit.

Figure 8:
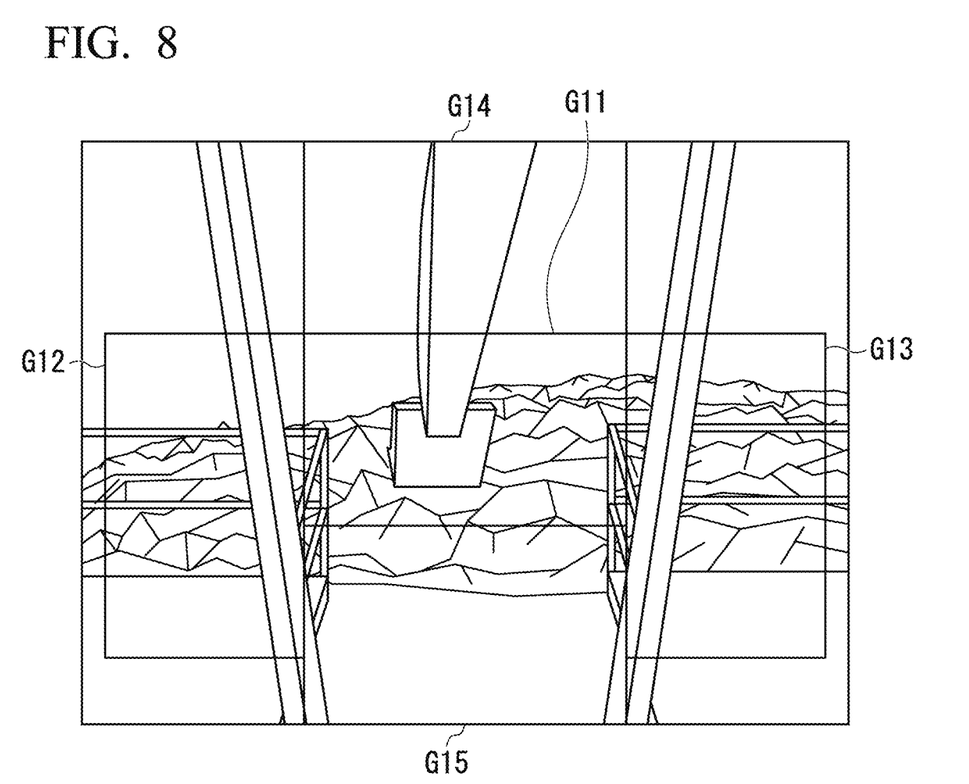
FIG. 8 is a view illustrating an example of an image cut out from an image captured by a front camera.

FIG. 8 is a view illustrating an example of an image cut out from an image captured by the front camera.

The image cutout unit 5102 cuts out each of a central image G11 for displaying on the central display 521, a left image G12 for displaying on the left display 522, a right image G13 for displaying on the right display 523, an upper image G14 for displaying on the upper display 524, and a lower image G15 for displaying on the lower display 525, from the image G1 captured by the front camera 122, which is received by the vehicle body information receiving unit 5101. Each image is cut out such that the operator of the loading vehicle 100 easily recognizes the topography of an excavation target and the position of the work equipment 130. In a case where the display device 520 is configured of one display, the image cutout unit 5102 may not cut out an image.

The loaded weight receiving unit 5103 receives information including the loaded weight and maximum loaded weight of the transport vehicle 200 from the controlling gear 300. The controlling gear 300 stores a maximum loaded weight for each transport vehicle 200 in the vehicle information storage unit 3303. Accordingly, the controlling gear 300 can recognize the maximum loaded weight of each transport vehicle 200 even in a case where the plurality of transport vehicles 200 having different vehicle classes travel. The loaded weight receiving unit 5103 is an example of a loaded weight acquisition unit.

Figure 9:
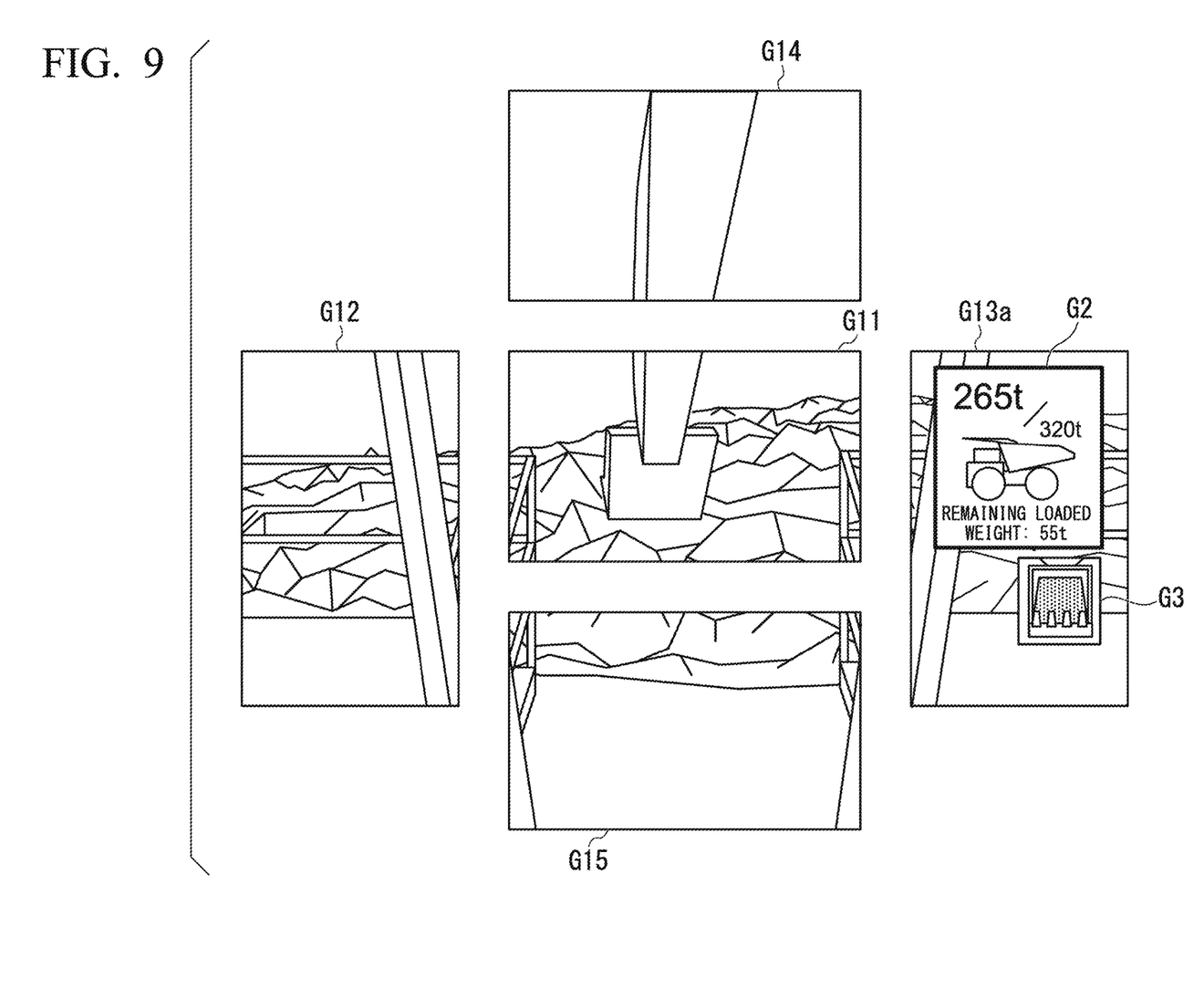
FIG. 9 is a view illustrating an example of a display image displayed by a display device according to the first embodiment.

FIG. 9 is a view illustrating an example of a display image displayed by the display device according to the first embodiment.

The display image generation unit 5104 generates, for example, a right image for display G13a by disposing a loaded weight image G2 showing the loaded weight of the transport vehicle 200 received by the loaded weight receiving unit 5103 and a bucket internal image G3 received by the vehicle body information receiving unit 5101 on the right image G13 cut out by the image cutout unit 5102. The loaded weight image G2 includes, for example, the loaded weight, maximum loaded weight, and remaining loaded weight of the transport vehicle 200. Although a side view of the transport vehicle 200 is drawn in the loaded weight image G2 of FIG. 9, the side view may be, for example, stored in advance in the storage 5300.

The control device 550 causes the central display 521 to display the central image G11. The control device 550 causes the left display 522 to display the left image G12, The control device 550 causes thy: right display 523 to display the right image for display G13a, The control device 550 causes the upper display 524 to display the upper image G14. The control device 550 causes the lower display 525 to display the lower image G15.

The operation signal transmission unit 5106 generates an operation signal based on the operation of the first operation device 530 by the operator and transmits the operation signal to the loading vehicle 100. In addition, the operation signal transmission unit 5106 generates an operation signal based on the operation of the second operation device 540 by the operator and transmits the operation signal to the controlling gear 300.

<<Display Control Method of Remote Operation Room>>

Figure 10:
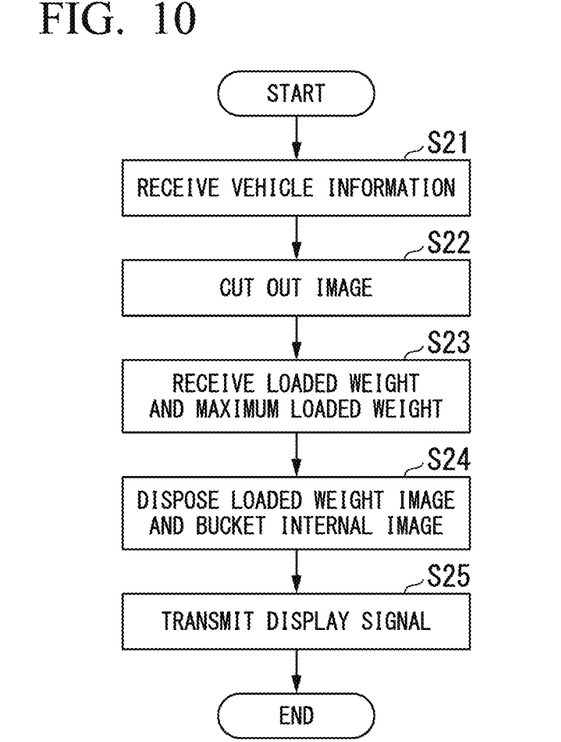
FIG. 10 is a flowchart showing a display control method implemented by the control device for the remote operation room according to the first embodiment.

FIG. 10 is a flowchart showing a display control method implemented by the control device for the remote operation room according to the first embodiment. When the loading vehicle 100 is started to be performed remote operation, the control device 550 executes the following display control in a predetermined cycle.

The vehicle body information receiving unit 5101 receives vehicle body information from the control device 126 of the loading vehicle 100 (Step S21). Next, the image cutout unit 5102 cuts out each of the central image G11, the left image G12, the right image G13, the upper image G14, and the lower image G15 from the image G1 captured by the front camera 122 in the received vehicle body information (Step S22).

Next, the loaded weight receiving unit 5103 receives the loaded weight and maximum loaded weight of the transport vehicle 200 from the controlling gear 300 (Step S23). The display image generation unit 5104 generates the right image for display G13a by disposing the loaded weight image G2 showing the received loaded weight and maximum loaded weight and the bucket internal image G3 on the right image G13 (Step S24). The display control unit 5105 generates a display signal for displaying the central image G11, the left image G12, the right image for display G13a, the upper image G14, and the lower image G15 on the display device 520 and transmits the display signal to the display device 520 (Step S25).

<<Workings and Effects>>

As described above, the control device 550 of the remote operation room 500 according to the first embodiment acquires a loaded weight measured in a target transport vehicle, which is a loading operation target of the loading vehicle 100, out of the plurality of transport vehicles 200, from the controlling gear 300 and causes the display device 520 to display the right image for display G13a obtained by disposing the loaded weight image G2 on the right image G13. Accordingly, the control device 550 allows the operator of the loading vehicle 100 to easily recognize the loadage of the transport vehicle 200. In another embodiment, the loaded weight image G2 may be disposed on an image other than the right image G13.

In addition, the control device 550 of the remote operation room 500 according to the first embodiment disposes the loaded weight image G2 and the bucket internal image G3 captured by the bucket camera 123 mounted on the loading vehicle 100 on the right image G13. Accordingly, the operator can recognize the loadage of the transport vehicle 200 while checking the state of the loading vehicle 100. In particular, by making the bucket internal image G3 visually recognizable, the operator in a remote control room can easily adjust the amount of load in the bucket 133. In another embodiment, the bucket internal image G3 may not be included in the right image for display G13a. The right image for display G13a may include an image showing a measurement value measured by another sensor mounted on the loading vehicle 100 (for example, the inclination of the loading vehicle 100 and the posture of the work equipment 130).

In addition, in the operation system 1 according to the first embodiment, the controlling gear 300 receives, from the transport vehicle 200, an arrival notification indicating the arrival to the loading point P3 and transmits the loaded weight related to the transport vehicle 200 that is a transmitter of the arrival notification, to the remote operation room 500. Accordingly, the controlling gear 300 can transmit the loaded weight measured in the target transport vehicle, which is a loading operation target of the loading vehicle 100, to the remote operation room 500. In another embodiment, the controlling gear 300 may specify a target transport vehicle without depending on the arrival notification. For example, the controlling gear 300 according to another embodiment may specify the transport vehicle 200 stopped at the loading point P3 near the loading vehicle 100 based on position information of the transport vehicle 200. In addition, in another embodiment, the controlling gear 300 may transmit the position information, azimuth direction information, and loaded weight of each of all of the transport vehicles 200 to the remote operation room 500, and the control device 550 of the remote operation room 500 may specify a target transport vehicle. In addition, in another embodiment, the control device 126 of the loading vehicle 100 may have some or all of the functions of the control device 550. In this case, the control device 126 may obtain payload information of the transport vehicle 200 through inter-vehicle communication.

In addition, although the control device 550 of the remote operation room 500 functions as the display control device for the display device 520 in the first embodiment, the invention is not limited thereto. For example, in another embodiment, some functions of the control device 550 may be realized by an external server device. In this case, the display control device is configured of the control device 550 and the external server device.

In addition, although the display control device is mounted on the operation system 1 in the embodiment described above, the invention is not limited thereto. For example, in another embodiment, the display control device may be applied to a radio control system that operates the loading vehicle 100 through wireless communication at a position outside the loading vehicle 100 where the loading vehicle 100 is visually recognizable. In a case of being applied to the radio control system, for example, a display device may be mounted on the control device.

INDUSTRIAL APPLICABILITY

The display control device according to the present invention allows the operator of the loading vehicle related to remote control to easily recognize the loadage of the transport vehicle.

The invention claimed is:

1. A display control device for a display device disposed in a remote operation room, the display control device comprising a processor configured to:
acquire an image captured by an imaging device mounted on a loading vehicle;
acquire a loaded weight measured by a weight scale mounted on a transport vehicle;
acquire a measurement value measured by a sensor mounted on the loading vehicle;
divide the captured image into a plurality of images comprising:
a central image to be displayed on a central display,
a left image to be displayed on a left display,
a right image to be displayed on a right display,
an upper image to be displayed on an upper display, and
a lower image to be displayed on a lower display;
generate a display image obtained by disposing an image showing the loaded weight and an image showing the measurement value on the right image; and
output the display image to the display device disposed in the remote operation room.

2. The display control device according to claim 1, wherein the processor is configured to acquire, from a controlling gear, the loaded weight measured by the weight scale mounted on the transport vehicle, the transport vehicle being an operation target of the loading vehicle among a plurality of transport vehicles that are configured to travel in an unmanned manner based on receiving a travel instruction from the controlling gear.

3. The display control device according to claim 1, wherein the loading vehicle and the transport vehicle are separate vehicles.

4. The display control device according to claim 1, wherein the remote operation room is remote from the loading vehicle and the transport vehicle.

5. The display control device according to claim 1, wherein the loading vehicle is spaced apart from the transport vehicle and configured to provide a load to the transport vehicle.

6. The display control device according to claim 1, wherein the display control device is located remote from each of the loading vehicle and the transport vehicle and configured to communicate with each of the loading vehicle and the transport vehicle through an access point.

7. The display control device according to claim 1, wherein the display device includes the central display, the left display, the right display, the upper display, and the lower display.

8. The display control device according to claim 1, wherein the central display, the left display, the right display, the upper display, and the lower display are disposed in the remote operation room,
wherein the left display and the right display are disposed at left and right sides of the central display, respectively, and
wherein the upper display and the lower display are disposed above and below the central display, respectively.

9. The display control device according to claim 1, wherein the central display, the left display, the right display, the upper display, and the lower display are separate display devices that are arranged in the remote operation room.

10. The display control device according to claim 1, wherein the central display, the left display, the right display, the upper display, and the lower display are parts of the display device disposed in the remote operation room.

11. A display control system comprising:
a display device disposed in a remote operation room; and
a display control device comprising a processor configured to:
acquire an image captured by an imaging device mounted on a loading vehicle,
acquire a loaded weight measured by a weight scale mounted on a transport vehicle,
acquire a measurement value measured by a sensor mounted on the loading vehicle,
divide the captured image into a plurality of images comprising:
a central image to be displayed on a central display,
a left image to be displayed on a left display,
a right image to be displayed on a right display,
an upper image to be displayed on an upper display, and
a lower image to be displayed on a lower display,
generate a display image obtained by disposing an image showing the loaded weight and an image showing the measurement value on the right image, and
output the display image to the display device disposed in the remote operation room.

12. A display control method of a display device disposed in a remote operation room, the display control method comprising:
acquiring an image captured by an imaging device mounted on a loading vehicle;
acquiring a loaded weight measured by a weight scale mounted on a transport vehicle;
acquiring a measurement value measured by a sensor mounted on the loading vehicle;
dividing the captured image into a plurality of images comprising:
a central image to be displayed on a central display,
a left image to be displayed on a left display,
a right image to be displayed on a right display,
an upper image to be displayed on an upper display, and
a lower image to be displayed on a lower display;
generating a display image obtained by disposing an image showing the loaded weight and an image showing the measurement value on the right image; and
displaying the display image on the display device disposed in the remote operation room.

* * * * *